Feb. 11, 1969     S. A. RISHOVD     3,426,991
WHEEL ALIGNMENT GAUGE ADAPTER
Filed Dec. 5, 1966
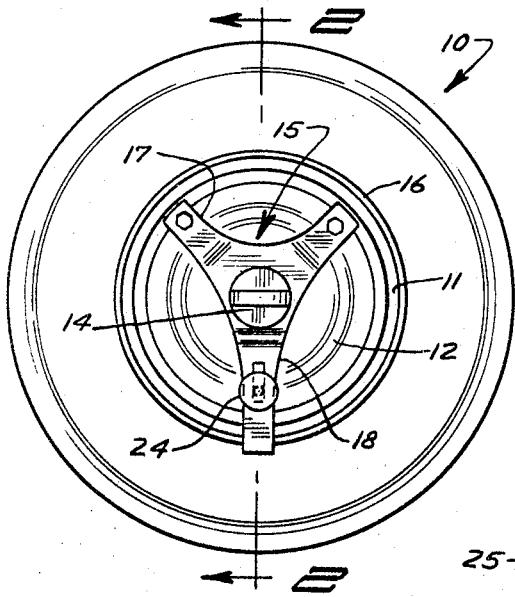
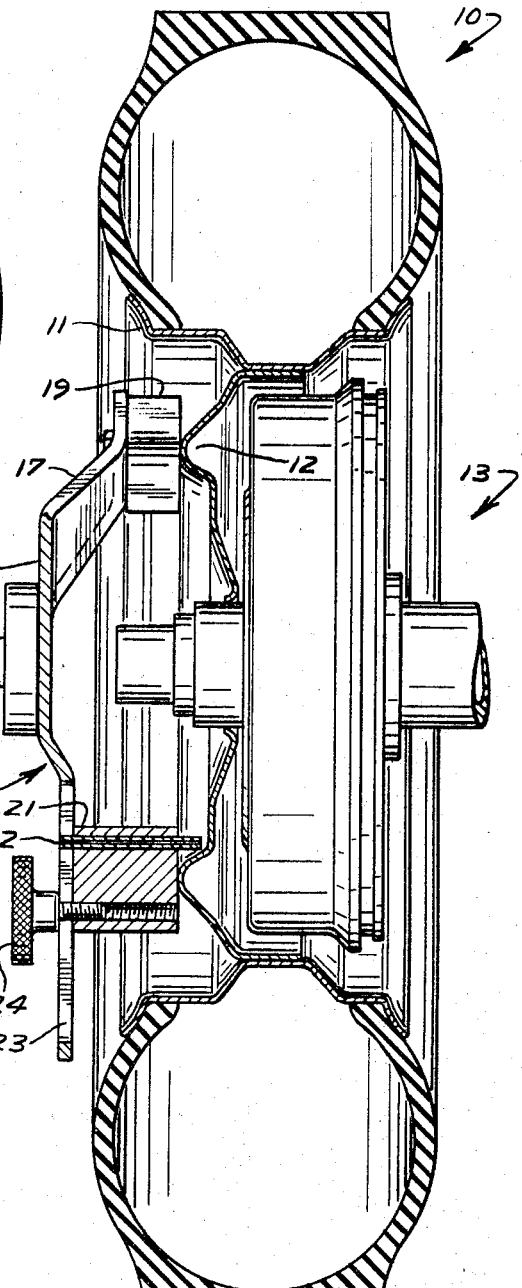
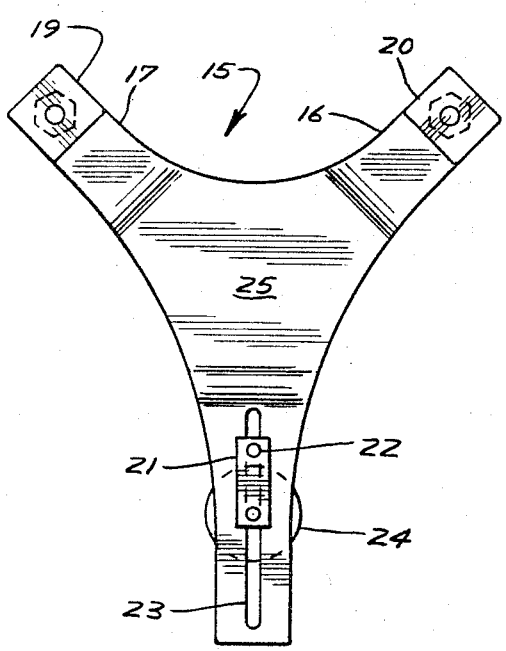
INVENTOR.
SIGURD A. RISHOVD
BY
*Carlson, Carlson & Storm*
ATTORNEYS United States Patent Office 3,426,991
Patented Feb. 11, 1969

3,426,991
WHEEL ALIGNMENT GAUGE ADAPTER
Sigurd A. Rishovd, Minneapolis, Minn., assignor to Bishman Manufacturing Company, Osseo, Minn., a corporation of Minnesota
Filed Dec. 5, 1966, Ser. No. 599,309
U.S. Cl. 248—205
Int. Cl. G01b *11/275*
6 Claims

ABSTRACT OF THE DISCLOSURE

A wheel alignment gauge adapter having a planar wheel gauge supporting surface and a three member attaching and supporting arrangement defining a plane parallel to the wheel gauge surface. The three member attaching apparatus includes at least one magnetic member and at least one radially adjustable mechanical support member arranged so that the top portion of the adapter is magnetically affixed to a planar portion of a wheel and the bottom portion is in planar and mechanical supporting engagement with the same portion of a wheel. The three member arrangement allows use of the "roll" of a wheel for accurate wheel alignment measurement.

---

This invention relates generally to wheel alignment apparatus and is more particularly directed to an adapter for supporting a wheel alignment gauge in a predetermined relationship with the plane of rotation of a wheel, the alignment of which is to be measured or adjusted.

In the prior art with which my invention is concerned, there exist many examples of wheel attitude measurement and alignment devices for adjusting the wheels on, for example, an automobile in a proper attitude with respect to the longitudinal axis of the vehicle. It is common to many of the systems to utilize the plane of rotation of a wheel for measurement purposes. At least two basic types of apparatus have been developed; one uses a planar surface of a wheel from which suitable alignment gauging measurement may be taken and the other utilizes an axis that is perpendicular to the plane of rotation of a wheel, for example, an axle upon which a wheel is rotatably disposed. My invention is directed toward providing a novel and improved adapter for translating an accurate planar surface of a wheel to a location at which suitable gauging apparatus may be utilized to perform measurement or adjustment of the plane of rotation of the wheel with respect to a predetermined reference as required by the geometry of a wheeled vehicle.

My invention is particularly well suited to use in conjunction with the type of wheel alignment gauges that are intended to be magnetically attached to a planar surface on a wheel. As one example of this type of magnetically attached wheel alignment gauge, reference is made to U.S. Patent No. 3,171,206 entitled "Measuring Instrument" and issued Mar. 2, 1965 in the name of Baxter Bender.

In considering the general configuration of the wheels in common use, it may be seen that the outer rim of a wheel is generally unsatisfactory insofar as defining a reference surface in the plane of rotation of a wheel due to its susceptibility to mechanical deformation. It may also be seen that the center portions of a wheel are either generally not accessible for measurement purposes or do not contain accurate planar surfaces related to the plane of rotation of the wheel. There is at least one intermediate planar surface in a wheel disposed concentrically intermediate the outer rim and the center portion of a wheel. This surface is known as the "roll" of a wheel which is readily accessible but, because of the range in sizes of wheels, and the generally accepted form of wheel gauge alignment equipment, has not proven satisfactory as a reference plane for measurement purposes. Various forms of adapters found in the prior art include a channel-shaped member adapted to be disposed with its open parts toward the roll of a wheel and including a depending clamping arrangement that is held in place by the wheel nut or stud during the measurement procedure. A further prior art adapter is comprised entirely of magnetic material and requires the use of large powerful magnets to retain the adapter in place on a wheel when measurements are made.

In the present invention, it will be seen that I have provided a lightweight, adjustable and accurate wheel gauge adapter that utilizes a combination of a hinge-like engagement of the top inner portion of the adapter to the roll of a wheel and a mechanical stop to vertically support the adapter with respect to the roll of a wheel. The adapter of my invention is highly portable, easily attached and removed, light in weight and highly accurate in transforming or translating the plane of rotation of a wheel from an accurate planar surface on the wheel to an accessible location for wheel alignment measurement.

It is therefore an object of my invention to provide an improved wheel alignment gauge supporting adapter.

Another object of my invention is to provide an improved wheel gauge supporting adapter that is accurate and efficient.

A still further object of my invention is to provide an improved lightweight wheel alignment gauge adapter.

These and other objects of my invention will become apparent from a consideration of the appended specification, claims and drawing, in which—

FIG. 1 is a front elevation view of a vehicle wheel upon which my invention is shown in operative disposition;

FIG. 2 is an enlarged sectional view of the wheel and a portion of an automobile axle taken along section lines 2—2 on FIG. 1; and FIG. 3 is an enlarged rear elevation view of the wheel gauge adapter shown in FIGS. 1 and 2.

Referring now to the drawings in which like elements are identified by like reference characters, there is shown in FIGS. 1 and 2, a vehicle wheel in its typical environment with a pneumatic tire mounted thereon, and identified generally by the reference character 10. Vehicle wheel 10 is shown including a peripheral tire bead engaging rim portion 11 and an intermediate annular outwardly protruding roll portion 12. As may occur to those skilled in the art, roll portion 12 of the wheel is fabricated during the process of manufacturing the wheel to define an annular planar surface defining portion of the wheel that is perpendicular to the axis of rotation of the wheel and parallel to the plane of rotation of the wheel. The wheel is shown suitably mounted through means (not shown) for rotation on an axle assembly identified generally by reference character 13 and representing a portion of, for example, the rear axle and wheel assembly, including a brake drum, of a wheel vehicle. As noted above, it is the plane of rotation of wheel 10 that is to be considered in connection with the application and use of suitable wheel alignment or measurement apparatus of the class that may be embodied in a wheel engagement gauge of the type referred to in the above-noted patent and as illustrated generally in the apparatus identified by reference character 14 in FIGS. 1 and 2 of the drawing.

The wheel alignment gauge adapter of my invention is shown as including a frame member 15, which may be comprised of a Y-shaped rigid material having a pair of top leg portions 16 and 17, a bottom leg portion 18 and a substantially planar gauge supporting surface 25 extending radially outwardly for receiving, engaging and supporting a wheel alignment gauge while disposed in an attitude parallel to the plane of rotation of a wheel. The radial extremities of axially inwardly extending top leg members 16 and 17 are shown having magnetic wheel engaging members 20 and 19, respectively, fixedly mounted thereon with the inwardly disposed portions of the wheel engaging members lying in a plane parallel to gauge supporting surface 25. A further wheel engaging member, preferably comprised of nonmagnetic material, is shown adjustably slidably disposed on bottom leg 18 of frame 15 and in a similar manner includes an inwardly disposed surface that lies in the plane of the inward surfaces of members 19 and 20 on top legs 17 and 16 of frame 15 whereby the three inner surfaces defined by wheel engaging members 19, 20 and 21 serve to define a plane that is parallel to wheel alignment gauge supporting surface 25 on frame 15. Wheel engaging member 21 further includes a tubular stop member extending axially of the inner surface and axially of the outer surface to engage a slot 23 provide in bottom leg 18 of frame 15. A further screw threaded member 24, including an operating knob therefor, is shown extending from the outer surface of bottom leg 18 through slot 23 and into a suitable like threaded receptacle in wheel engaging member 21 for the purposes of adjustably positioning wheel engaging member 21 radially of bottom leg 18.

From a consideration of the drawings and the above-noted elements of the illustrative embodiment, it may be apparent to those skilled in the art that frame member 15 may be comprised of a circular frame and that it may be inverted with respect to the utilization of a magnetic, hinge-like, axial engagement with the top of the roll of a wheel and one or more circumferentially spaced wheel engaging members, similar to member 21 in the illustrative embodiment, utilized to vertically support frame 15. Further, while the preferred embodiment shows a three surface configuration of wheel engaging members to define a planar surface as the best known embodiment of my invention, it may be necessary or desirable to use more or less wheel engaging members to obtain certain operating characteristics as may be desired.

OPERATION

In operation of the illustrated embodiment of my invention, frame 15 may be utilized with or without wheel alignment gauge 14 disposed in operating position on surface 25. In either event, the device may be suitably and conveniently oriented as shown on FIG. 1 of the drawings with bottom leg 18 extending downwardly and is applied to the roll 12 of a wheel by first engaging wheel engaging members 19 and 20 in the spaced relationship shown to the outer extremity of the roll 12 of a wheel. At this time, the plane of gauge support surface 25 may conveniently be at an angle to the plane of rotation of the wheel and normally the lower portion of frame 15 will be canted slightly outwardly from the plane of rotation of the wheel and the plane defined by roll portion 12 of the wheel. Knob 24 may be loosened to slidably adjustably position wheel engaging member 21 so that its inner surface is in solid engagement with the axial extremity of the lower portion of roll 12 on wheel 10 and stop member 22 is in radial engagement with an inwardly axially displaced portion of roll 12 so as to substantially support the vertical component of weight of the wheel gauge adapter. Following this, knob 24 may be turned in a proper direction to maintain wheel engaging member 21 in the proper attitude and wheel gauge 14 may then be utilized to perform the necessary measurements and/or adjustments of wheel 10 with respect to the vehicle upon which it is mounted.

It is understood that suitable modifications may be made in the structure as disclosed, provided such modifications come within the spirit and scope of the appended claims.

Having now therefore fully illustrated and described my invention, what I claim to be new and desire to protect by Letters Patent is:

1. Apparatus of the class above described, comprising in combination:
   (a) a frame including an axially outwardly extending planar wheel gauge supporting surface;
   (b) at least two inwardly extending wheel engaging members disposed in wheel engaging and frame supporting relationship with said frame respectively, at least one of said members being adapted to fixedly engage a planar surface on a wheel and at least one other of said members having means for radially adjustably, slidably engaging said frame and being adapted to engage said planar surface of a wheel at an inner portion and further including an inwardly extending wheel engaging portion to supportedly engage a further portion of a wheel, the inner portions of said wheel engaging members defining a plane parallel to the plane of the wheel gauge support surface on said frame.

2. The apparatus of claim 1 in which the frame includes a longitudinally elongated slot and the other of the members includes an outwardly extending portion slidably disposed in said slot.

3. The apparatus of claim 1 in which the members adapted to fixedly engage the planar surface of a wheel are comprised of material exhibiting magnetic characteristics.

4. The apparatus of claim 2 in which the members adapted to fixedly engage the planar surface of a wheel are comprised of material exhibiting magnetic characteristics.

5. The apparatus of claim 1 in which the frame is comprised of material exhibiting magnetic characteristics.

6. The apparatus of claim 2 in which the frame is comprised of material exhibiting magnetic characteristics.

References Cited

UNITED STATES PATENTS

| | | | |
|---|---|---|---|
| 1,931,020 | 10/1933 | Clark | 248—286 |
| 2,927,758 | 3/1960 | MacMillan | 248—205 |
| 2,929,599 | 3/1960 | Hemmeter | 248—205 |
| 2,952,435 | 9/1960 | MacMillan | 248—205 |
| 3,033,508 | 5/1962 | Prohaska | 248—286 |
| 3,185,424 | 5/1965 | Sloop | 248—300 XR |
| 3,245,165 | 4/1966 | Podoloff | 248—206 |

CHANCELLOR E. HARRIS, *Primary Examiner.*

U.S. Cl. X.R.

248—286, 300